United States Patent
Buchheit et al.

(10) Patent No.: US 9,521,363 B1
(45) Date of Patent: *Dec. 13, 2016

(54) ENHANCING A CAMERA ORIENTED USER INTERFACE VIA A REMOTE EYE FOCUS GUIDE

(71) Applicants: Brian K. Buchheit, Davie, FL (US); Satesh Ramcharitar, Hollywood, FL (US)

(72) Inventors: Brian K. Buchheit, Davie, FL (US); Satesh Ramcharitar, Hollywood, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/156,884

(22) Filed: May 17, 2016

Related U.S. Application Data

(63) Continuation of application No. 14/657,705, filed on Mar. 13, 2015, now Pat. No. 9,344,673.

(51) Int. Cl.
*H04N 7/14* (2006.01)
*H04N 7/15* (2006.01)
*H04N 5/232* (2006.01)
*G06F 3/01* (2006.01)

(52) U.S. Cl.
CPC .............. *H04N 7/144* (2013.01); *G06F 3/013* (2013.01); *H04N 5/23219* (2013.01); *H04N 7/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,046,767 A | * | 4/2000 | Smith | H04N 7/15 348/14.16 |
| 2007/0291466 A1 | * | 12/2007 | Krestakos | H04N 7/142 362/33 |
| 2010/0177159 A1 | * | 7/2010 | Tojo | G06T 7/0048 348/14.16 |

* cited by examiner

*Primary Examiner* — Joseph J Nguyen
(74) *Attorney, Agent, or Firm* — Patents on Demand P.A.; Brian K. Buchheit; Scott M. Garrett

(57) ABSTRACT

A live video conference session can be established between a first device and second remotely located devices each having a first and second camera as an input peripheral. The first and second camera can capture a first and second video stream of a first and second session participant. During the live video conference session, the first and second video stream can be continuously conveyed in real time over a network to displays of each device. The first video stream can be analyzed to programmatically determine that a position of the first participant is non-optimal as seen by the second participant. An eye guide can be presented on a user interface to assist the first participant to focus their eyes in a new location indicated by the eye. If subsequent detects improved eye focus with the second participant the eye guide can be dismissed.

19 Claims, 10 Drawing Sheets

Scenario 310

Photographer View 311

Subject View 351

Scenario 901

ENHANCING A CAMERA ORIENTED USER INTERFACE VIA A REMOTE EYE FOCUS GUIDE

CROSS REFERENCE TO RELATED APPLICATIONS

This application claims priority to the utility patent entitled "EHANCING A CAMERA ORIENTED USER INTERFACE VIA AN EYE FOCUS GUIDE" that is application Ser. No. 14/657,705, filed Mar. 13, 2015, now U.S. Pat. No. 9,344,673. U.S. Pat. No. 9,344,673 is incorporated herein, in its entirety.

BACKGROUND

The present invention relates to the field of self-portraiture and, more particularly, to enhancing a camera oriented user interface via a remote eye focus guide.

Many computing devices today include one or more cameras which allow users to interact with other users via video conferencing. Video conferencing leverages a camera and a display of a computing device allowing a user and their friend to remotely view and talk. The display presents a live video of the remote friend and the camera captures live video of the user interacting with the computing device. In many instances, the user can be unaware that the live video stream presented on a display directs their eye focus to the screen. This appears to the friend as the user is not paying attention to them since their eye focus is not directed at the camera capturing the live video.

BRIEF SUMMARY

One aspect of the present invention can include a system, an apparatus, a computer program product, and a method for enhancing a camera oriented user interface via a remote eye focus guide. A live video conference session can be established. A first device can include a first camera as an input peripheral that can capture a first video stream of a first session participant. A second device can include a second camera as an input peripheral that can capture a second video stream of a second session participant. The first device and the second device can be remotely located devices. During the live video conference session, the first video stream can be continuously conveyed in real time over a network to the second device. The second device can continuously display in real time the first video stream upon a second display peripheral of the second device. During the live video conference session, the second video stream can be continuously conveyed in real time over the network to the first device. The first device can continuously display in real time the first video stream upon a first display peripheral of the first device. During the live video conference session, the first device can analyze the first video stream to programmatically determine from the analyzing that a position of the first session participant is non-optimal. The non-optical position can refer to a position of the first participant as seen by the second participant via the second display peripheral lacking eye focus with the second participant during the live video conference session. An eye guide can be presented on a user interface of the first display to assist the first participant to focus their eyes in a new location indicated by the eye guide during the live video conference session, responsive to results of the analyzing. The eye guide can be a graphical symbol and a text indicating a direction for moving eyes of the first participant. The first device can analyze in a subsequent analysis, the first video stream to programmatically determine from the subsequent analysis that a position of the first session participant is improved with regard to eye focus with the second participant during the live video conference session. In response to results of the subsequent analysis, the eye guide can be dismissed on the user interface of the first display.

Another aspect of the present invention can include a method, an apparatus, a computer program product, and a system for enhancing a camera oriented user interface via a remote eye focus guide. A live video conference session can be established. A first device can include a first camera as an input peripheral that can capture a first video stream of a first session participant. A second device can include a second camera as an input peripheral that can capture a second video stream of a second session participant. The first device and the second device can be remotely located devices. During the live video conference session, the first video stream can be continuously conveyed in real time over a network to the second device. The second device can continuously display in real time the first video stream upon a second display peripheral of the second device. During the live video conference session, the second video stream can be continuously conveyed in real time over the network to the first device. The first device can continuously display in real time the first video stream upon a first display peripheral of the first device. During the live video conference session, the first device can analyze the first video stream to programmatically determine from the analyzing that a position of the first session participant is non-optimal. The non-optical position can refer to a position of the first participant as seen by the second participant via the second display peripheral lacking eye focus with the second participant during the live video conference session. An eye guide can be presented on a user interface of the first display to assist the first participant to focus their eyes in a new location indicated by the eye guide during the live video conference session, responsive to results of the analyzing. The eye guide can be a graphical symbol and a text indicating a direction for moving eyes of the first participant. The first device can analyze in a subsequent analysis, the first video stream to programmatically determine from the subsequent analysis that a position of the first session participant is improved with regard to eye focus with the second participant during the live video conference session. In response to results of the subsequent analysis, the eye guide can be dismissed on the user interface of the first display.

Yet another aspect of the present invention can include a method, an apparatus, a system, and a computer program product for enhancing a camera oriented user interface via a remote eye focus guide. A live video conference session can be established. A first device can include a first camera as an input peripheral that can capture a first video stream of a first session participant. A second device can include a second camera as an input peripheral that can capture a second video stream of a second session participant. The first device and the second device can be remotely located devices. During the live video conference session, the first video stream can be continuously conveyed in real time over a network to the second device. The second device can continuously display in real time the first video stream upon a second display peripheral of the second device. During the live video conference session, the second video stream can be continuously conveyed in real time over the network to the first device. The first device can continuously display in real time the first video stream upon a first display peripheral of the first device. During the live video conference session, the first device can analyze the first video stream to programmatically determine from the analyzing that a position of the first session participant is non-optimal. The non-optical position can refer to a position of the first participant as seen by the second participant via the second display peripheral lacking eye focus with the second participant during the live video conference session. An eye guide can be presented on a user interface of the first display to assist the first participant to focus their eyes in a new location indicated by the eye guide during the live video conference session, responsive to results of the analyzing. The eye guide can be a graphical symbol and a text indicating a direction for moving eyes of the first participant. The first device can analyze in a subsequent analysis, the first video stream to programmatically determine from the subsequent analysis that a position of the first session participant is improved with regard to eye focus with the second participant during the live video conference session. In response to results of the subsequent analysis, the eye guide can be dismissed on the user interface of the first display.

DETAILED DESCRIPTION

Figure 1:
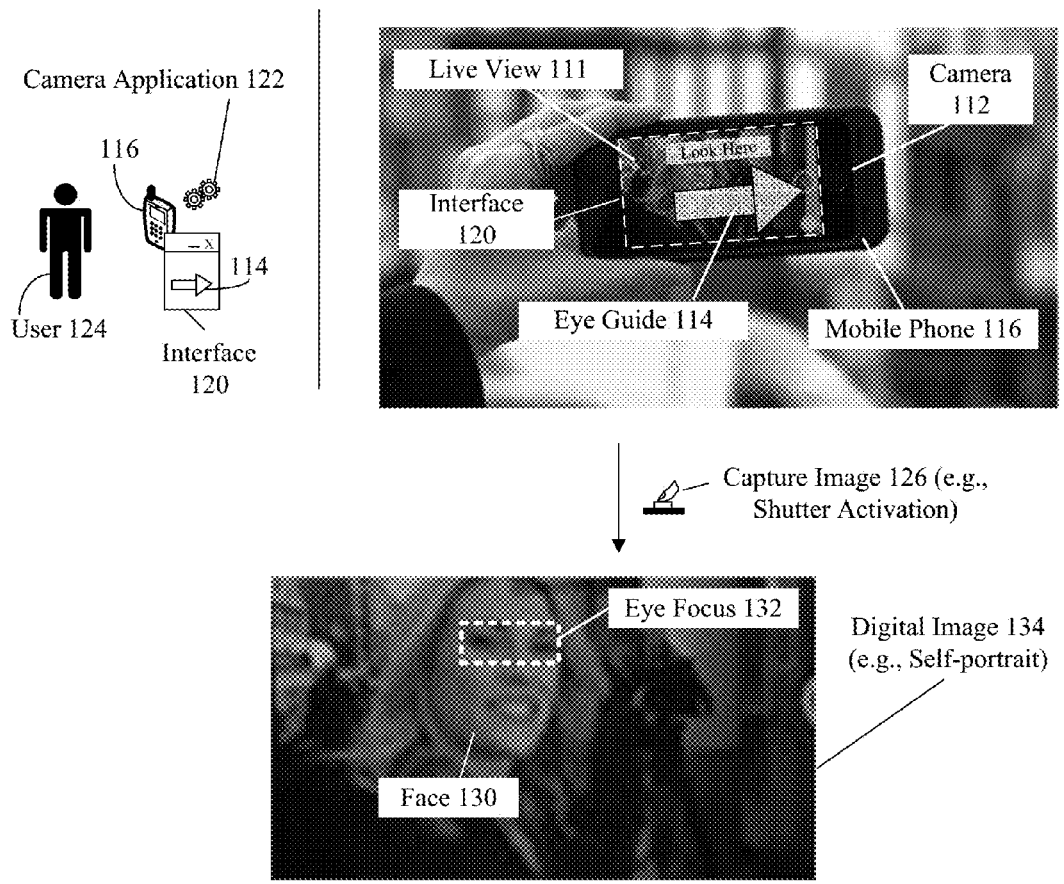
FIG. 1 is a schematic diagram illustrating a scenario for enhancing a camera oriented user interface via a remote eye focus guide in accordance with an embodiment of the inventive arrangements disclosed herein.

The present disclosure is a solution for enhancing a camera oriented user interface via a remote eye focus guide. In the solution, a computing device with an integrated camera can present a live view within an interface of a display of the computing device. In one embodiment, a different proximate computing device can present an eye guide simultaneously while the live view is presented on the interface of the computing device. In the embodiment, the eye guide can direct a user eye gaze to the eye guide or lense of the camera during media capture. In one configuration of the embodiment, the eye guide can be coupled to content permitting different content to be linked to different eye guides.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a scenario for enhancing a camera oriented user interface via an eye focus guide an in accordance with an embodiment of the inventive arrangements disclosed herein.

As used herein, camera 112 can be an optical instrument which can records media that can be stored directly or indirectly. Camera 112 can include, but is not limited to, a shutter, a lense, an image sensor, a display, and the like. Camera 112 can include, a digital single reflect lense (DSLR) camera, a digital point and shoot, a microelectromechanical (MEMS) camera, and the like. In one embodiment, camera 112 can be integrated or embedded into a computing device. In the embodiment, camera 112 can be a Complementary metal-oxide-semiconductor (CMOS) image sensor with a fixed focus lense. For example, camera 112 can be a component of a floating element group suspended by ceramic bearings and a small rare earth magnet. It should be appreciated that camera 112 can provide a live view 111 of a real world environment.

In scenario 110, a user interacting with a camera application 122 executing within mobile phone 116 can be assisted in recording a self-portrait digital image 134. In one embodiment, an interface for camera application 122 can utilize camera 112 to present a live view 111 of camera 112 view. In the embodiment, an eye guide 114 can be simultaneously presented to assist user 124 in directing the user's 124 eye focus 132 towards camera 112 during image 134 capture. For example, eye guide 114 can be presented within a camera application 122 interface 120 when the user starts an application 122 and is presented with a live view 111 from camera 112. In one instance, image 134 capture can be delayed for a suitable duration to enable the user 124 to focus their eyes on camera 112 (e.g., look at the lense of the camera). For example, a one second delay can be added to a camera application 122 functionality to permit user eye focus 132 to be directed at camera 112 prior to image 134 capture.

In one configuration, when user selects capture image action 126, eye guide 114 can be temporarily presented prior to digital image 134 being recorded. For example, user 124 can utilize camera 112 of phone 116 to take a "selfie" (e.g., self-portrait). In the configuration, eye guide 114 can be presented within a transparent overly which can direct the user's gaze towards camera 112. For example, a phrase "look here" with a corresponding directional arrow pointing towards the camera can be presented prior to capture photograph 126 action. That is, eye guide 114 can help the user look directly into the lense of the camera 112 to permit the capture of a self-portrait photograph in which the user 124 appears to be looking at a viewer when the photograph is viewed by a viewer. In one instance, the guide 114 can include a UNICODE arrow, a graphical symbol, a computer graphics, an audible sound (e.g., indicating direction), an audible sound (e.g., associated with a direction), a visible notification (e.g., a bright light), and the like.

It should be appreciated that the eye guide 114 can be temporarily presented for a duration which can be user configurable. In one instance, guide 114 can be presented along with a countdown timer which can prepare a user 124 for capture photograph 126 action. That is, the user 124 can be cued to focus gaze and/or attention on camera 112 permitting user's 124 face 130 and/or eye focus 132 to be appropriately captured within digital image 134.

In one embodiment, eye guide 114 can be dynamically and/or statically configured. In the embodiment, eye guide 114 can be configured to draw a user's 124 gaze (e.g., eye focus 132) to any point of interest. That is, guide 114 can be utilized to easily direct a user's 124 attention to permit the user 124 to capture their photographic intent. It should be appreciated that eye guide 114 can be a pop-up notification, a opaque overlay, and the like.

In one instance, eye guide 114 can lack directional information. In the instance, eye guide 114 can indicate to a user that eye focus can be directed at the camera. For example, guide 114 can be a text notification in the live view which indicates "Look at the camera when taking the picture".

Drawings presented herein are for illustrative purposes only and should not be construed to limit the invention in any regard. It should be appreciated that eye guide 114 does not appear in digital image 134. It should be understood that the disclosure can be utilized with add-on cameras, external flashes, and the like.

Figure 2:
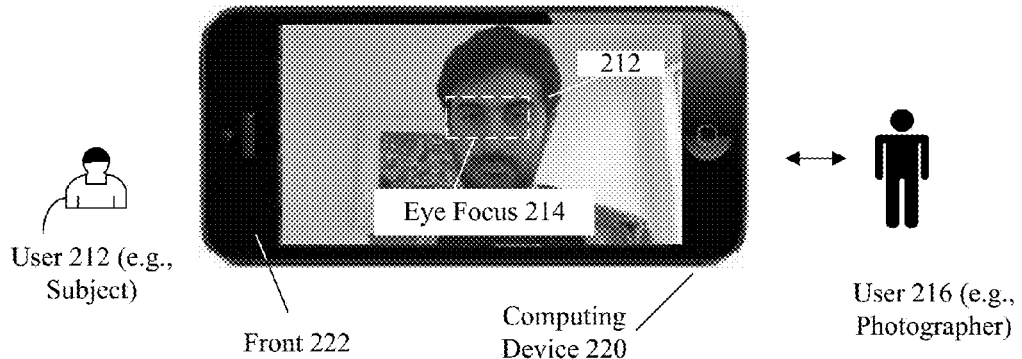
FIG. 2 is a schematic diagram illustrating a method for enhancing a camera oriented user interface via a remote eye focus guide in accordance with an embodiment of the inventive arrangements disclosed herein.
Figure 2:
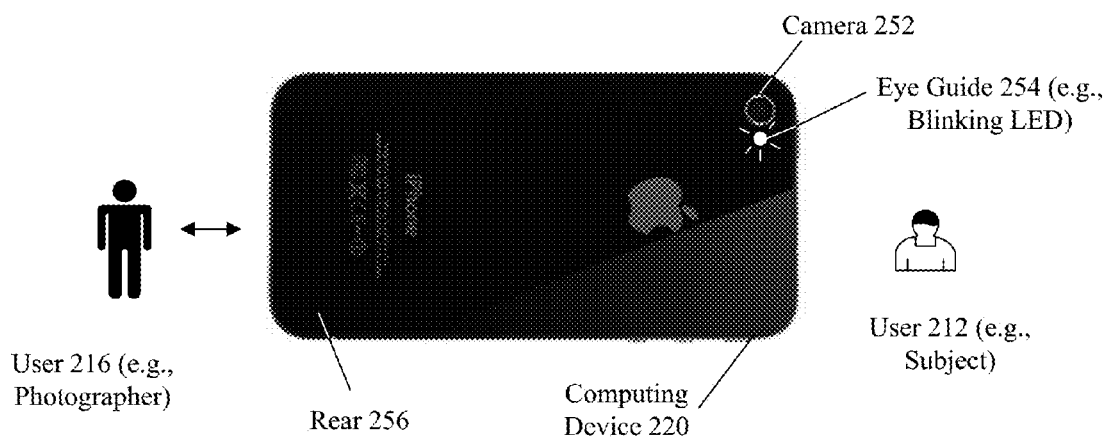

FIG. 2 is a schematic diagram illustrating a scenario for enhancing a camera oriented user interface via an eye focus guide an in accordance with an embodiment of the inventive arrangements disclosed herein.

Scenario 210 can present a photographer view 211 and a subject view 251. The photographer view 211 can include the front 222 of device 220 and subject view 251 can include rear 256 of device 220. In scenario 210, a user 216 can utilize computing device 220 to take a picture of user 212 using camera 252 of device 220. Device 220 can include a front which can present a live preview of camera 252 view and a rear 256 which can include a camera 252 and a LED light (e.g., flash). In one embodiment, the disclosure can utilize device 220 to be configured to permit an LED associated with the device to function as an eye guide 254. In the embodiment, eye guide 254 can be utilized to draw user's 212 eye focus 214 to camera 252 area. For example, device 220 can trigger LED light to blink several times prior to capturing a photograph which can be utilized to draw user's 212 eye focus 214. That is, a photographer can tell the subject to look at the blinking light to easily direct subject eye focus with minimal effort.

Figure 3:
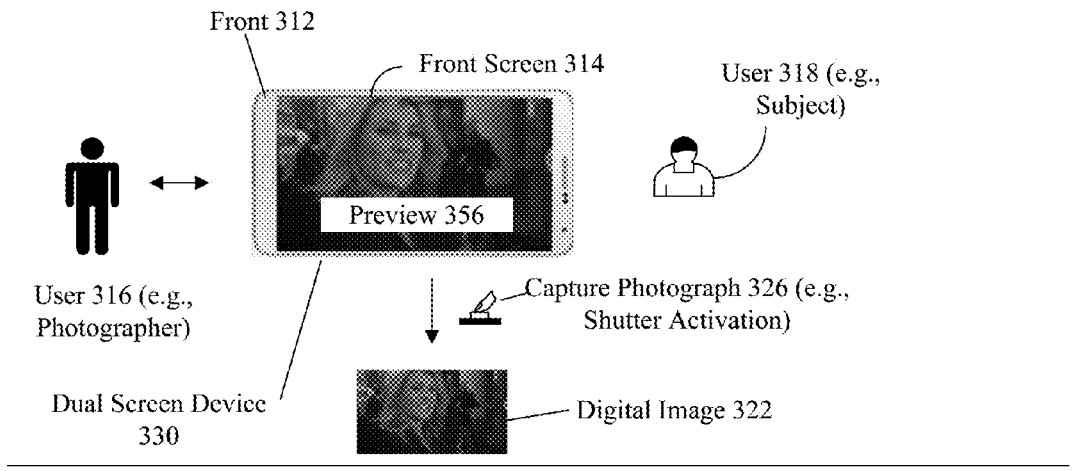
FIG. 3 is a schematic diagram illustrating a scenario for enhancing a camera oriented user interface via a remote eye focus guide in accordance with an embodiment of the inventive arrangements disclosed herein.
Figure 3:
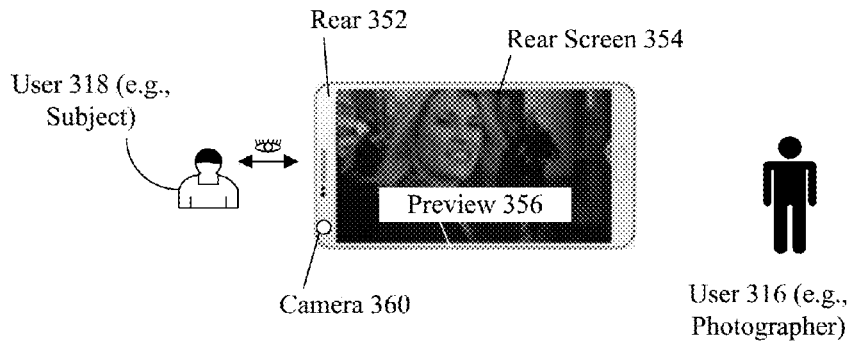

FIG. 3 is a schematic diagram illustrating a scenario for enhancing a camera oriented user interface via an eye focus guide an in accordance with an embodiment of the inventive arrangements disclosed herein.

Scenario 310 can include a photographer view 311 and a subject view 351. The photographer view 311 can present the front screen 314 of dual screen device 330 and subject view 351 can present the rear screen 354 of device 330. In scenario 310, a user 316 can utilize dual screen device 330 to present a preview 356 of a digital photograph 322 captured by camera 360 on rear screen 354. For example, when a photographer (e.g., 316) performs capture photograph 326 action (e.g., shutter activation), a preview 356 can be presented on front screen 314 and rear screen 354 permitting both the photographer and the subject 318 to proof the photograph 322.

In one embodiment, an eye guide (e.g., 114) can be presented on rear screen 354 prior to capture photograph 326 action. In the embodiment, when a camera 360 is utilized by an application to provide a live view of camera 360 view, an eye guide can be presented. That is, rear screen 354 can present an eye guide for subject 318 to see which can guide subject 318's attention appropriately.

Figure 4:
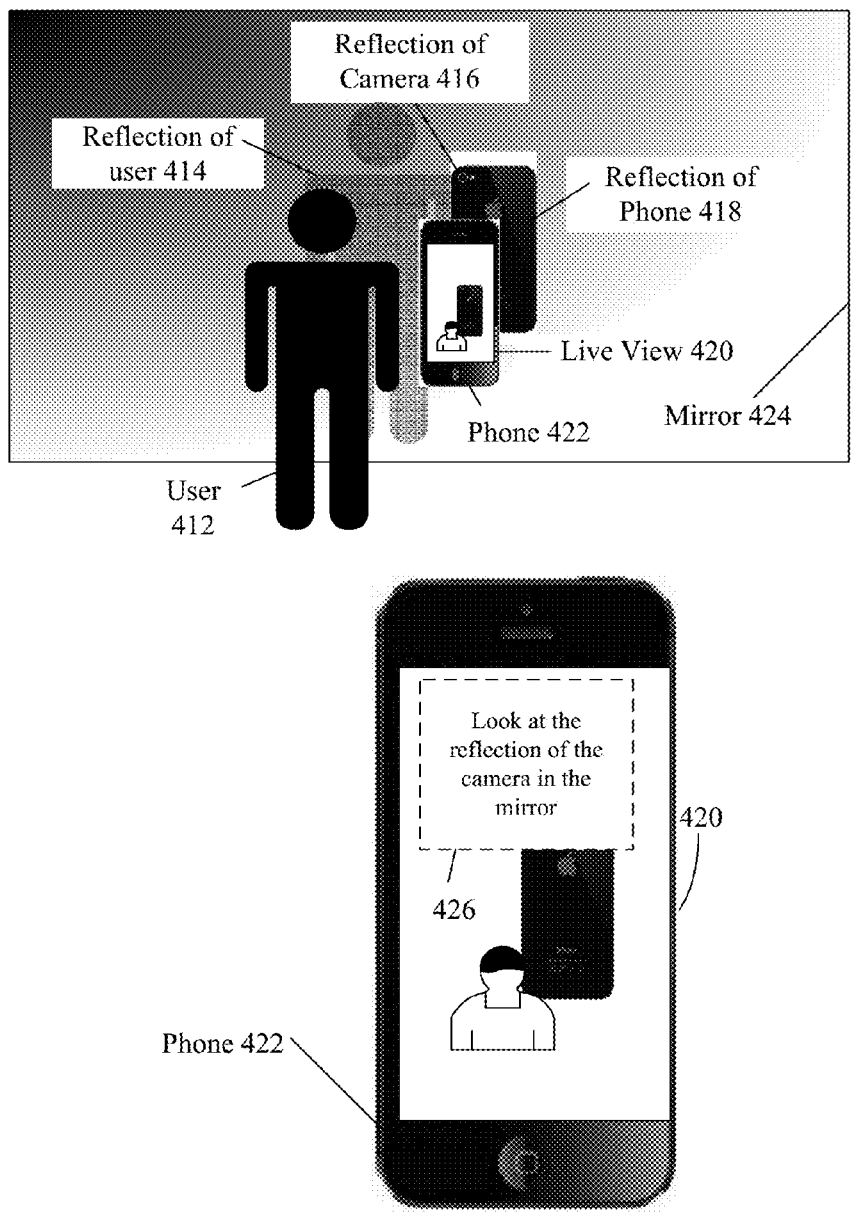
FIG. 4 is a schematic diagram illustrating a scenario for enhancing a camera oriented user interface via a remote eye focus guide in accordance with an embodiment of the inventive arrangements disclosed herein.

FIG. 4 is a schematic diagram illustrating a scenario for enhancing a camera oriented user interface via an eye focus guide an in accordance with an embodiment of the inventive arrangements disclosed herein.

In scenario 410, a user 412 can utilize camera 416 of phone 422 to take a picture of themselves in a mirror 424 (e.g., selfie). Mirror 424 can produce reflection of user 414 and reflection of phone 418 which can be seen by user 412. Camera (not shown) of phone 422 can capture mirror 424 reflections such that phone 422 can present a live preview 420 of reflection of user 414, reflection of camera 416, and reflection of phone 418. In one embodiment, an eye guide 426 can be presented within preview 420 (e.g., as a transparent overlay) to direct user's gaze towards reflection of camera 416. For example, when a user 412 attempts to compose a photograph with phone 422, eye guide 426 can assist in simplifying eye focus since user 412 can be easily confused where their gaze should be directed towards. In one embodiment, camera LED (not shown) can be utilized to direct the user's attention to reflection of camera 416 within mirror 424. For example, camera LED can blink intermittently during photograph composition or can produce an colored light which can draw the user's eye gaze/attention. It should be appreciated that the disclosure can be configured to not interfere with LED's traditional functionality (e.g., as a flash). That is, during photograph capture, LED can be utilized as a strobe flash to increase the light within a photograph as it has traditionally.

In one embodiment, disclosure can permit phone 422 to detect a self portrait photograph taken with a mirror. In the embodiment, the disclosure can permit the photograph to be automatically inverted along a vertical axis (e.g., unmirrored).

Figure 5:
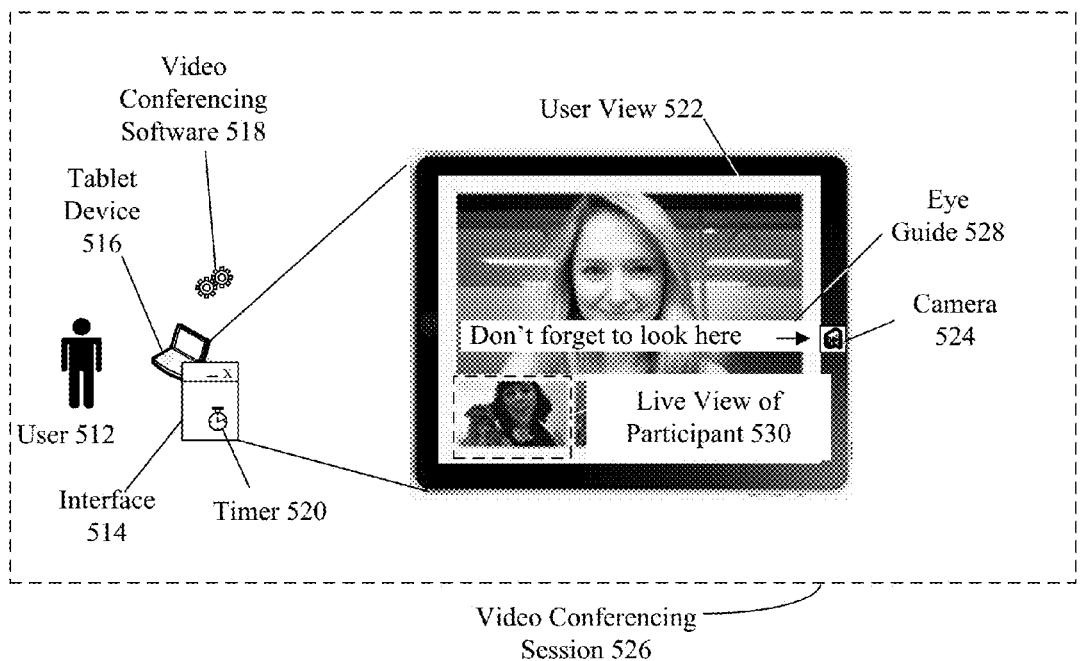
FIG. 5 is a schematic diagram illustrating a scenario for correcting positions of participants in a live video conference session in accordance with an embodiment of the inventive arrangements disclosed herein.
Figure 5:
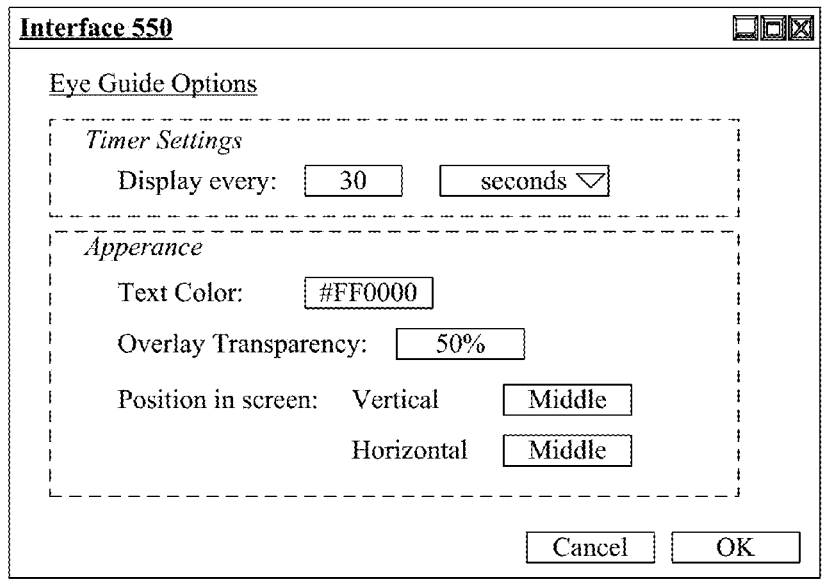

FIG. 5 is a schematic diagram illustrating a scenario for correcting positions of participants in a live video conference session in accordance with an embodiment of the inventive arrangements disclosed herein.

In scenario 510, a user 512 can interact with a tablet device 516 executing video conferencing software 518 to participate in a video conferencing session 526. Software 518 can present a user view 522 within interface 514 which can include one or more live views 530 (e.g., real-time or near real-time) of participants 526. Device 516 can include a camera 524 which can capture a live view of user 512 for session 526. In one embodiment, eye guide 528 can be intermittently presented during session 526 to remind user 512 to direct their gaze to camera 524. In the embodiment, guide 528 can reinforce social norms (e.g., such as eye contact) to help participants in session 526 communicate more naturally and efficiently.

In one embodiment, a timer 520 can be utilized to control eye guide 528 presentation and persistence (e.g., duration). In one configuration of the embodiment, timer 520 can be a global timer (e.g., for the session), which can keep track of elapsed time and at intervals (e.g., every 5 minutes), can trigger eye guide 528 to be presented. In another configuration of the embodiment, timer 520 can be utilized to help the user 512 hold "eye contact" with a participant for an appropriate duration of time (e.g., one second). That is, timer 520 can function as a threshold causing eye guide 528 to be continuously presented until user 512 eye focus is detected for the minimum threshold (e.g., two seconds).

It should be appreciated that focus/gaze detection can be performed utilizing traditional and/or proprietary mechanisms.

It should be appreciated that disclosure can leverage existing session timers (e.g., call duration time).

Figure 6:
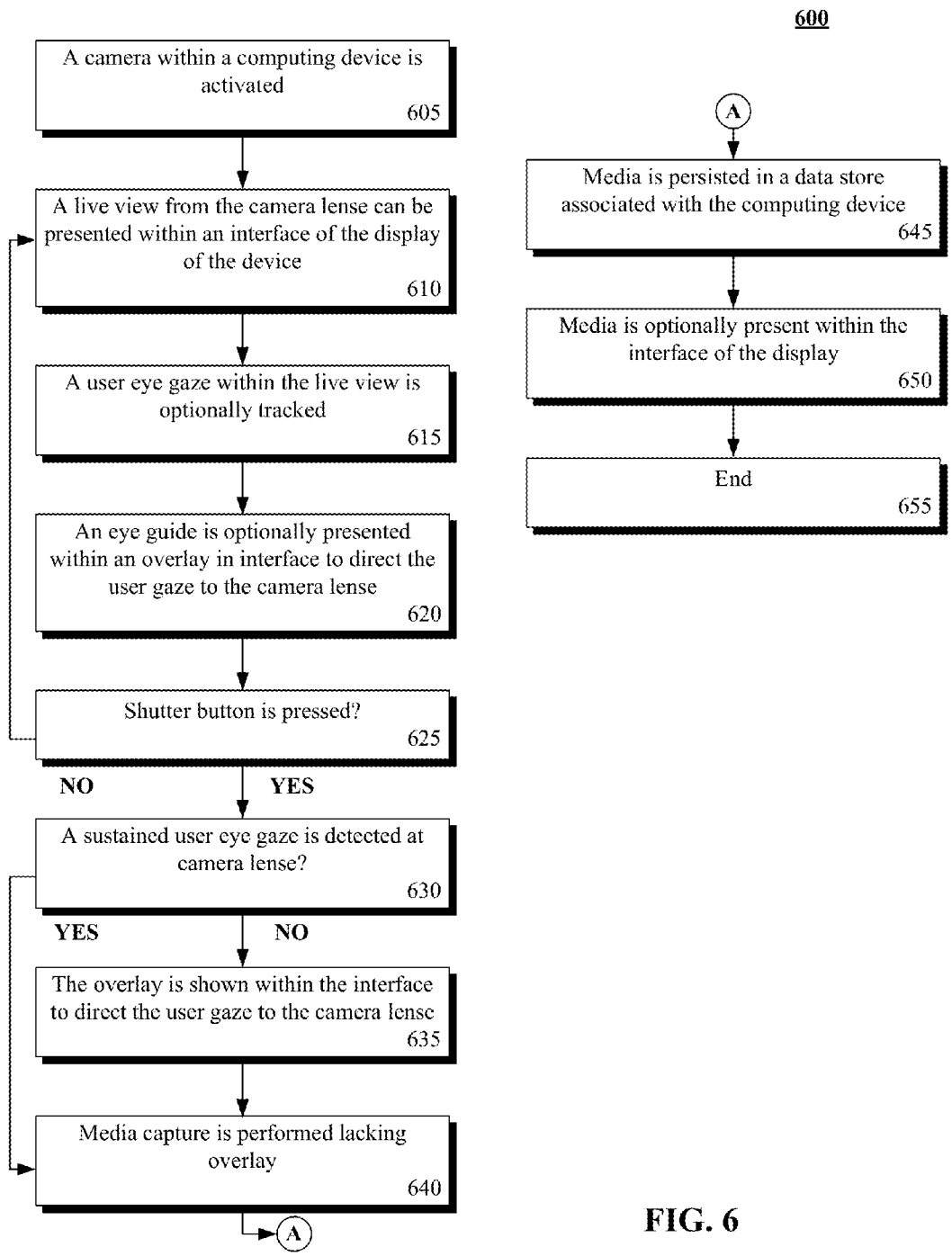
FIG. 6 is a flowchart illustrating a method for enhancing a camera oriented user interface via a remote eye focus guide in accordance with an embodiment of the inventive arrangements disclosed herein.

FIG. 6 is a flowchart illustrating a method for enhancing a camera oriented user interface via an eye focus guide an in accordance with an embodiment of the inventive arrangements disclosed herein.

In step 605, a camera within a computing device can be activated. In step 610, a live view from the camera lense can be presented within an interface of the display of the device. In step 615, a user eye gaze can within the live view can be optionally tracked. In step 620, an eye focus guide can be optionally presented within an overlay in the interface to direct the user eye gaze to the camera lense. In step 625, if the shutter button is pressed, the method can continue to step 630, else return to step 610. In step 630, if a sustained user eye gaze is detected at camera lense, the method can continue to step 640, else proceed to step 635. In step 635, the overlay can be presented within the interface to direct the user gaze to the camera lense. In step 640, a media capture can be performed by the camera lacking the user eye guide overlay. In step 45, the media can be persisted within a data store associated with the computing device. In step 650, the media can be optionally presented within the interface of the display. In step 655, the method can end.

Drawings presented herein are for illustrative purposes only and should not be construed to limit the invention in any regard. It should be appreciated that method 600 can be performed in real-time or near real-time. Further, method 600 can be performed in serial and/or in parallel. In one embodiment, method 600 can be performed when a self-portrait mode is activated. In another embodiment, steps of method 600 can be performed when a front facing camera is activated. It should be appreciated that method 600 can include optional steps and can include additional steps.

Figure 7:
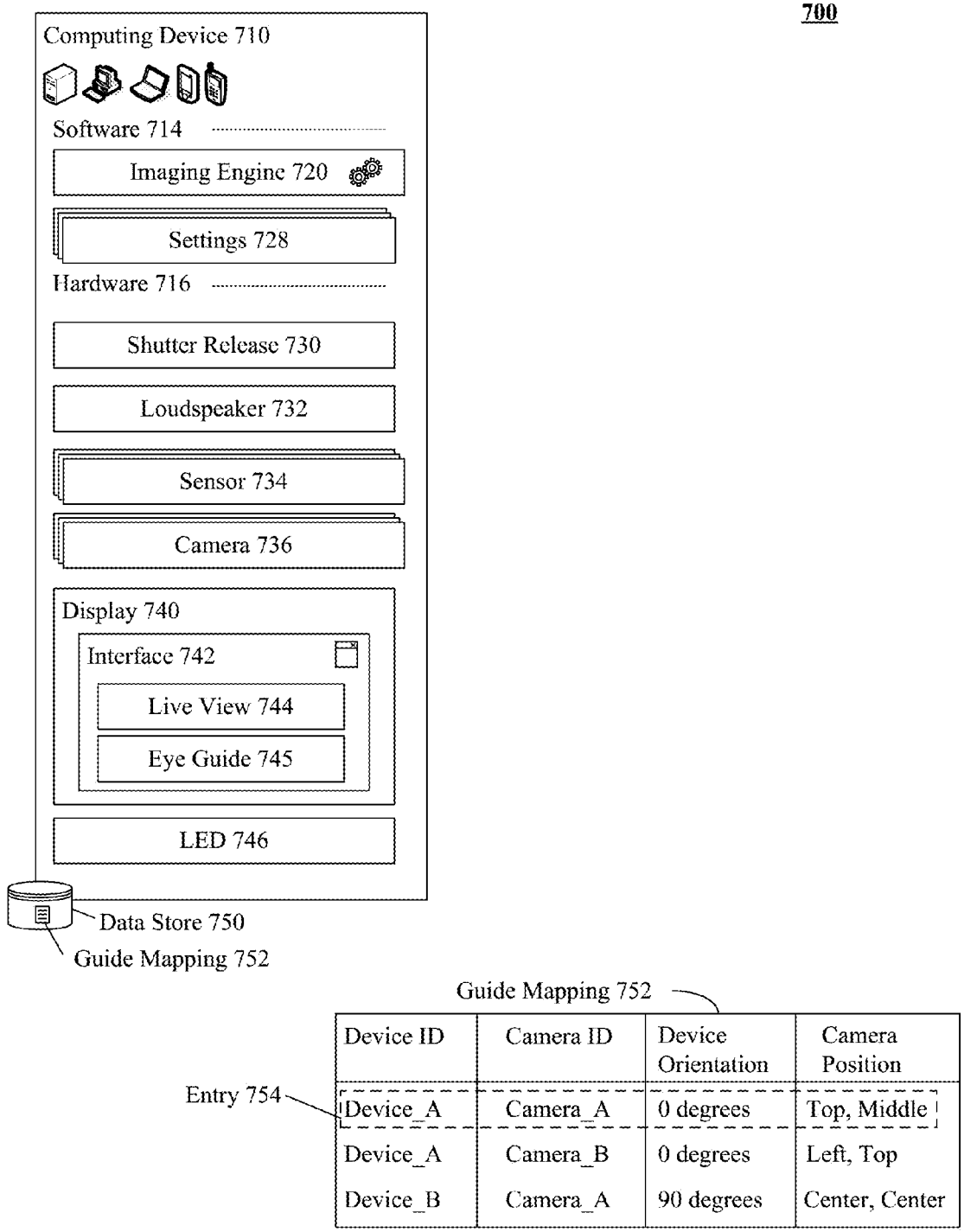
FIG. 7 is a schematic diagram illustrating a system for enhancing a camera oriented user interface via a remote eye focus guide in accordance with an embodiment of the inventive arrangements disclosed herein.

FIG. 7 is a schematic diagram illustrating a system for enhancing a camera oriented user interface via an eye focus guide an in accordance with an embodiment of the inventive arrangements disclosed herein.

Computing device 710 can be a hardware/software element for presenting view 744 and/or eye guide 745. Device 710 can include, but is not limited to, software 714, hardware 714, and the like. Software 714 can include, but is not limited to, imaging engine 720, settings 728, and the like. Hardware 716 can include, but is not limited to, a shutter release 730, one or more input/output components (e.g., microphone, loudspeaker 732, touchscreen, on-screen keyboard), a sensor 734 (e.g., accelerometer), a camera 736, display 740, interface 742, Light Emitting Diode (LED) 746, and the like. In one instance, device 710 can be communicatively linked to a server which can perform one or more the functionalities of the disclosure.

Guide mapping 752 can be a data set for enabling eye focus guide within the system 700 and/or device 710. Mapping 752 can include, but is not limited to, a device identifier, a camera identifier, a device orientation, a camera location, and the like. In one instance, an entry 754 can associate a camera position within a specific device based on the device orientation. In the instance, device identifier can include, but is not limited to, a device manufacturer (e.g., SAMSUNG, APPLE), a device model (e.g., iPHONE, NOTE), a device make (e.g., 6 PLUS, S6), and the like. In the instance, camera identifier can include, but is not limited to, a logical identifier (e.g., front, rear), a media access control (MAC) identifier, an Internet Protocol address (IP), a canonical identifier, a user established identifier, and the like. In one embodiment, device orientation can include vertical and/or horizontal orientation in a three dimensional space. In one configuration of the embodiment, a reference orientation normal to the ground can be established for the vertical orientation and/or a horizontal orientation. For example, when a user is holding a mobile phone in their hand (e.g., 0 degrees) and rotates (e.g., 90 degrees) the phone sideways to take a selfie, an orientation from the reference orientation can be determined. In one embodiment, camera position can include a coordinate pair/triplet value, an alphanumeric value, a numeric value, and the like. For instance, a camera position can be established for every orientation, enabling a suitable eye guide to be presented regardless of the phone orientation to the user.

In one embodiment, the disclosure can be utilized within the film making industry where camera focus from one or more actors within a scene is vital. In the embodiment, one or more audible or visible eye guides can be presented during media capture. In one instance, multiple eye guides can be utilized to assist multiple users in directing eye focus to a particular point of interest.

It should be appreciated that the disclosure can include one or more networks. Networks can be an electrical and/or computer network connecting one or more system 700 components. Networks can include, but is not limited to, twisted pair cabling, optical fiber, coaxial cable, and the like. Networks can include any combination of wired and/or wireless components. Networks topologies can include, but is not limited to, bus, star, mesh, and the like. Networks types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that components 714-746 can be an optional components of device 710. It should be appreciated that one or more components within system 700 can be optional components permitting that the disclosure functionality be retained.

Figure 8:
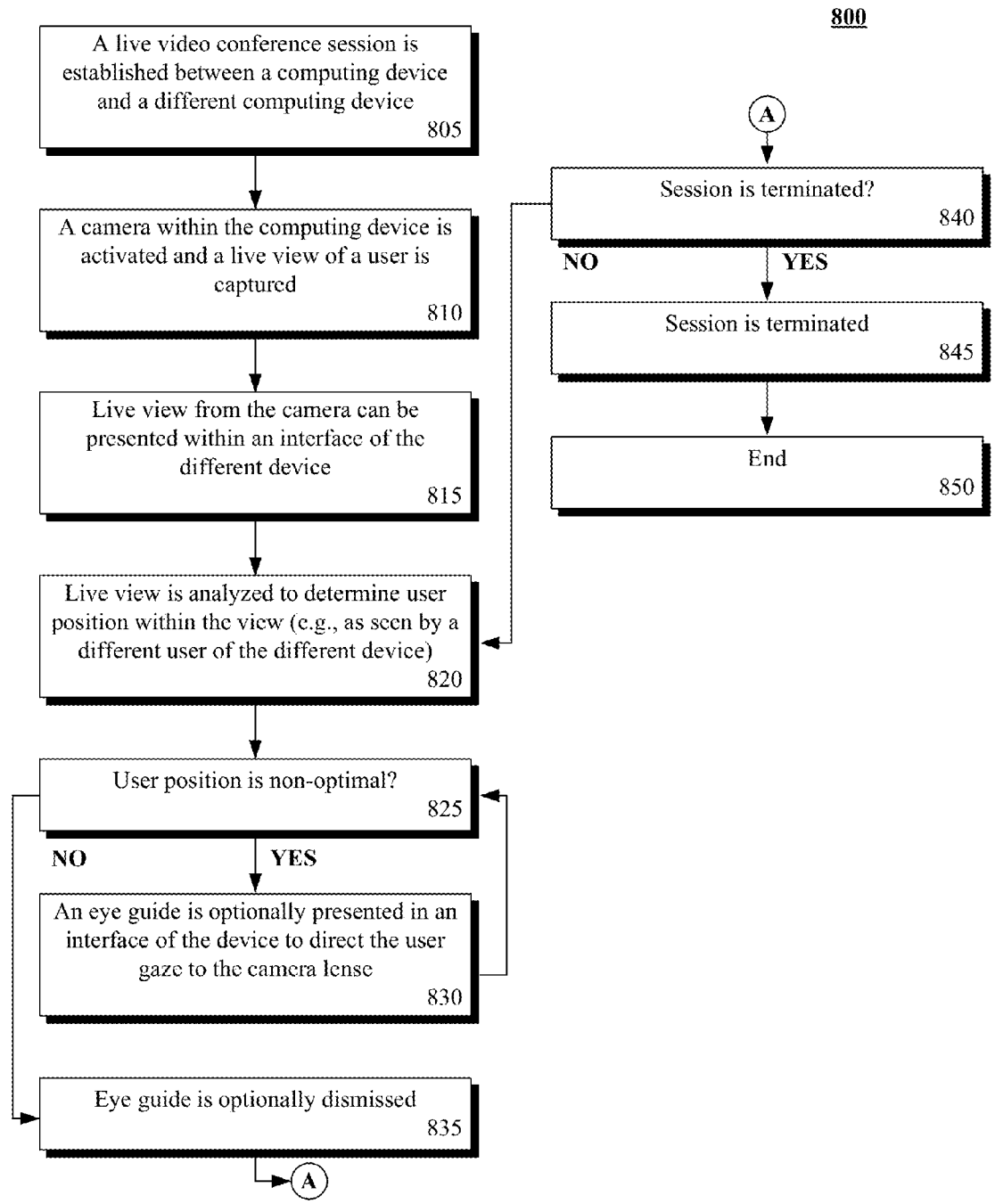
FIG. 8 is a flowchart illustrating a method for correcting positions of participants in a live video conference session in accordance with an embodiment of the inventive arrangements disclosed herein.

FIG. 8 is a flowchart illustrating a method for correcting positions of participants in a live video conference session in accordance with an embodiment of the inventive arrangements disclosed herein.

In step 805, a live video conference session can be established between a computing device and a different computing device. In step 810, a camera within the computing device can be activated and a live view of a user can be captured. In step 815, the live view from the camera can be presented within an interface of the different device. In step 820, live view can be analyzed to determine user position within the view. For example, the view can be determined if the different user can visually see the entirety of the user. In step 825, if the user position is non-optimal, the method can continue to step 825, else proceed to step 835. In step 830, an eye guide can be optionally presented in an interface of the device to direct the user gaze to the camera lense. In step 840, if the session is terminated, the method can proceed to step 845, else proceed to step 820. In step 845, the session can be terminated. In step 850, the method can end.

Drawings presented herein are for illustrative purposes only and should not be construed to limit the invention in any regard. It should be appreciated that method 800 can be performed in real-time or near real-time. Further, method 800 can be performed in serial and/or in parallel. In one embodiment, session can include multiple different computing devices (e.g., 5-way video conference).

Figure 9:
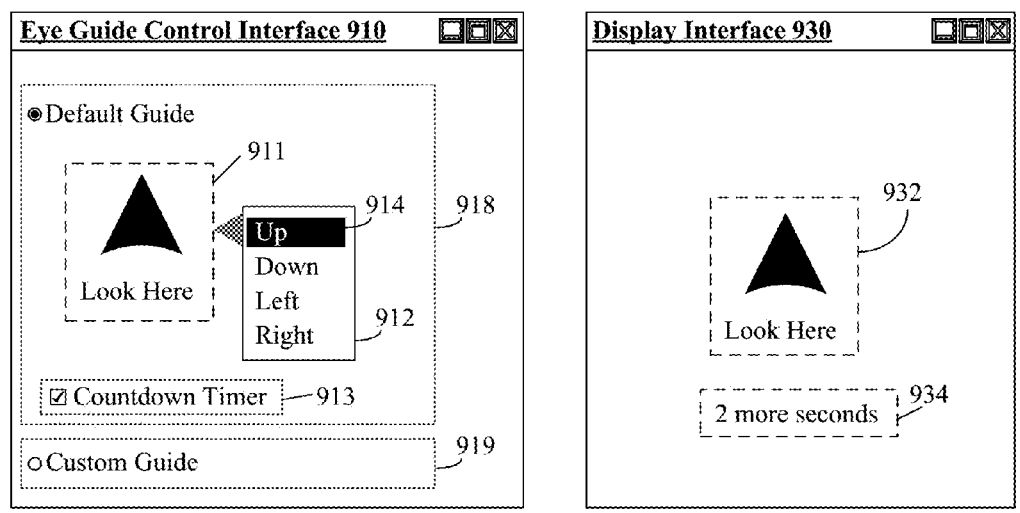
FIG. 9 is a schematic diagram illustrating a scenario for correcting positions of participants in a live video conference session in accordance with an embodiment of the inventive arrangements disclosed herein.
Figure 9:
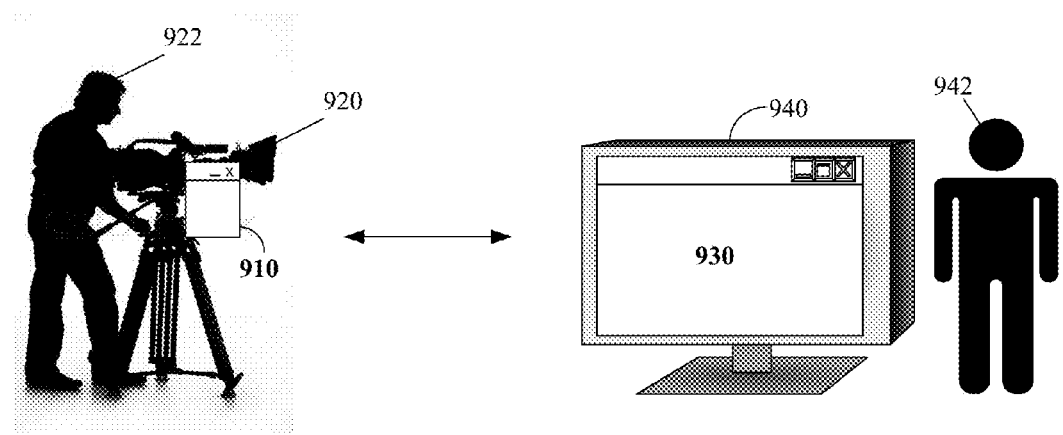

FIG. 9 is a schematic diagram illustrating a scenario 901 for correcting positions of participants in a live video conference session in accordance with an embodiment of the inventive arrangements disclosed herein.

In scenario, an eye guide 932 can be presented within a display interface 930 of a display 940. In the scenario, the display 940 can be visible to the user 942 and/or operator 922. An eye guide control interface 910 for controlling the presentation and/or configuration of eye guide 932 can be presented within a remote screen. In one instance, interface 910 can be presented within a remote display (e.g., camera 920 display). In the instance, interface 910 can be visible only to operator 922. That is, user 942 can be unable to view interface 910 when the interface 910 is presented within a display (e.g., 920). In one configuration of the instance, interface 910 can include, but is not limited to, guide option 918, 919, eye guide preview 911, timer settings 913, and the like. For example, scenario 901 can include a professional photo shoot in which the goal of the user 942 is to not look at camera 920 but to look at an imaginary target (e.g., guide 932). In one embodiment, the guide 932 can assist with photoshoots where the subject's attention is easily distracted. In the embodiment, guide 932 can include graphics, video, images, and the like. For example, an eye guide 932 can be presented on a remote screen for subjects such as babies and/or animals attention which are easily drawn to moving objects or colors.

It should be appreciated that camera 920 can be communicatively linked with display 940. For example, camera 920 can communicate wirelessly with display 940 over a WiFi direct compatible communication channel to control the presentation of guide 932.

In one embodiment, control interface 910 can permit operator 922 to configure the look and/or organization of guide 932. In the embodiment, a default guide 918 can be adjusted or a custom guide 919 can be configured by the operator (e.g., graphics upload, text input, etc.). In one instance, adjustment of a default guide can include changing the orientation of an eye guide directional indicator (e.g., eye guide target). In the instance, a context menu 912 can permit one or more pre-set options to be presented and/or selected. For example, when operator 922 selects guide option 918, a context menu 912 can present four cardinal directions in which to orient an arrow.

In one embodiment, operator 922 can establish one or more additional functionalities of the eye guide. In the embodiment, operator 922 can select a countdown timer setting which can present a countdown timer 934. In the embodiment, countdown timer 934 can permit operator to direct user 942 of the duration that the eye guide is required.

Figure 10:
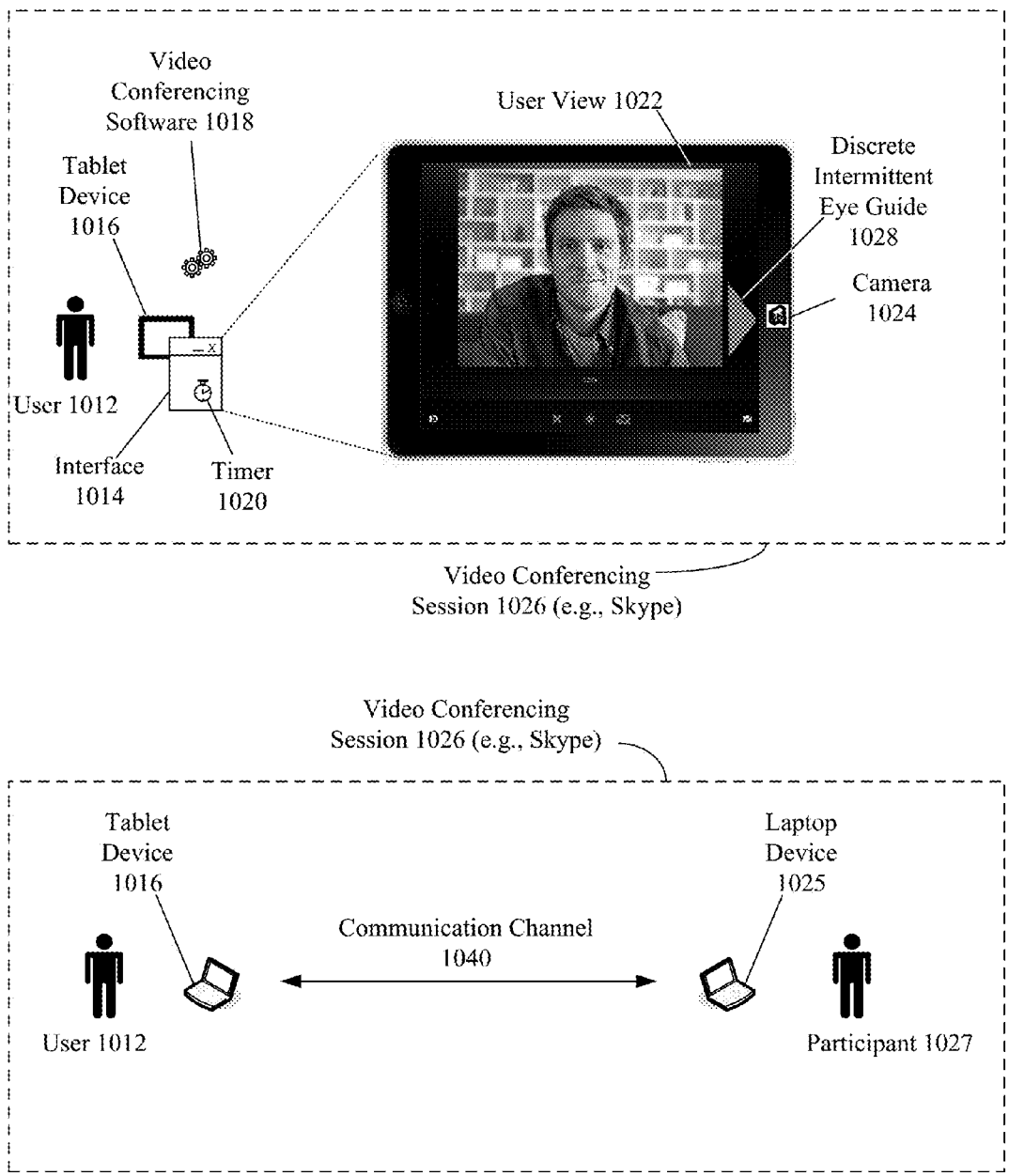
FIG. 10 is a schematic diagram illustrating a scenario for correcting positions of participants in a live video conference session in accordance with an embodiment of the inventive arrangements disclosed herein.

FIG. 10 is a schematic diagram illustrating a scenario 1010 for correcting positions of participants in a live video conference session in accordance with an embodiment of the inventive arrangements disclosed herein. In scenario 1010, a video conferencing session 1026 can include two or more communicatively linked devices 1016 and 1025. Devices 1016, 1025 can be linked via one or more communication channels 1040. Devices 1016, 1026 can be associated with one or more users 1012 and/or participants 1026.

In scenario 1010, a user 1012 can interact with a tablet device 1016 executing video conferencing software 1018 (e.g., SKYPE, FACETIME) to participate in a video conferencing session 1026. Software 1018 can present a user view 1022 within interface 1014 which can lack one or more live views (e.g., real-time or near real-time) of participants 1026. Device 1016 can include a camera 1024 which can capture a live view of user 1012 for session 1026. In one embodiment, a discrete intermittent eye guide 1028 can be intermittently presented during session 1026 to remind user 1012 to direct their gaze to camera 1024. In the embodiment, non-invasive guide 1028 can reinforce social norms (e.g., such as eye contact) to help participants in session 526 communicate more naturally and efficiently. It should be appreciated a traditional real-time self-portrait view causes users 1016 eyes to be drawn to the view which is adverse to maintaining eye contact during session. The disclosure has significant advantages over the traditional self-portrait view in that the discrete intermittent eye guide is only presented as needed (e.g., when eye contact is not established for a long time).

In one embodiment, a timer 1020 can be utilized to control eye guide 1028 presentation and persistence (e.g., duration). In one configuration of the embodiment, timer 1020 can be a global timer (e.g., for the session), which can keep track of elapsed time and at intervals (e.g., every 5 minutes), can trigger eye guide 1028 to be presented. In another configuration of the embodiment, timer 1020 can be utilized to help the user 1012 hold "eye contact" with a participant for an appropriate duration of time (e.g., one second). That is, timer 1020 can function as a threshold causing eye guide 1028 to be continuously presented until user 1012 eye focus is detected for the minimum threshold (e.g., two seconds).

It should be appreciated that focus/gaze detection can be performed utilizing traditional and/or proprietary mechanisms. It should be appreciated that disclosure can leverage existing session timers (e.g., call duration time).

The flowchart and block diagrams in the FIGS. 1-10 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for correcting positions of participants in a live video conference session comprising:
    establishing a live video conference session between a first device and a second device, the first device having a first camera as an input peripheral that captures a first video stream of a first session participant, the second device having a second camera as an input peripheral that captures a second video stream of a second session participant, wherein the first device and the second device are remotely located devices;
    during the live video conference session, continuously conveying the first video stream in real time over a network to the second device, wherein the second device continuously displays in real time the first video stream upon a second display peripheral of the second device;
    during the live video conference session, continuously conveying the second video stream in real time over the network to the first device, wherein the first device continuously displays in real time the first video stream upon a first display peripheral of the first device;
    during the live video conference session, the first device analyzing, in a first analysis, the first video stream to programmatically determine from the analyzing that a position of the first session participant is non-optimal, which refers to a position of the first participant as seen by the second participant via the second display peripheral lacking eye focus with the second participant during the live video conference session, wherein programmatically determining that the position is non-optimal comprises determining whether an eye focus rate of the first participant during the live video conference session falls within a previously established threshold range, wherein the eye focus rate is a ratio of a first time where an eye gaze of the first participant is directed at the first camera verses a second time where the eye gaze is not directed at the first camera;
    upon determining for the first analysis that the eye focus rate falls outside the previously established threshold range, presenting an eye guide on a user interface of the first display to assist the first participant to focus their eyes in a new location indicated by the eye guide during the live video conference session, wherein the eye guide comprises at least one of a graphical symbol and a text indicating a direction for moving eyes of the first participant;
    subsequent to presenting the eye guide and during the live video conference session, the first device analyzing, in a subsequent analysis, the first video stream to programmatically determine from the subsequent analysis that a position of the first session participant is improved with regard to eye focus with the second participant during the live video conference session, wherein the determination the position is improved comprises a determination that the eye focus rate falls within the previously established threshold range for the subsequent analysis; and upon determining for the subsequent analysis, that the eye focus rate falls within the previously established threshold range, updating the user interface so that it is no longer presenting the eye guide on the user interface of the first display.

2. The method of claim 1, wherein the eye guide is presented on a remote screen, wherein the remote screen is local to and visible to the first participant.

3. The method of claim 1, wherein the eye guide is controlled from a different computing device interface, wherein a different computing device controlling the different computing device interface is communicatively linked to the first camera.

4. The method of claim 1, upon determining that the eye guide is presented, suppressing a live self-portrait view of the first participant within the interface of the first display.

5. The method of claim 1, upon determining that the eye guide is no longer presented, presenting a live self-portrait view of the first participant within the interface of the first display.

6. The method of claim 1, wherein the eye guide shows a region within which the first participant is to look for the eye gaze to be considered as being directed towards the first camera.

7. The method of claim 1, upon determining that a position of the first participant is partially non-visible, using the eye guide to direct the eye gaze of the first participant to a live self-portraiture view within the interface of the first display.

8. The method of claim 1, further comprising:
establishing a socially acceptable quantity of time associated with eye contact between the first and second participants, wherein the previously established threshold range is created from the socially acceptable quantity of time.

9. The method of claim 1, further comprising:
establishing a range of eye positions for the eye gaze considered to be within a socially acceptable range to be considered as being directed at the first camera, wherein the first analysis and the second analysis utilize the range of eye positions to determine whether eye gaze is directed to the first camera or not.

10. A system for correcting positions of participants in a live video conference session comprising:
a processor;
a non-transitory storage medium storing programmatic instructions;
an imaging engine, comprising the programmatic instructions as executed by the processor causing the system to establish a live video conference session between a first device and a second device, the first device having a first camera as an input peripheral that captures a first video stream of a first session participant, the second device having a second camera as an input peripheral that captures a second video stream of a second session participant, wherein the first device and the second device are remotely located devices, wherein during the live video conference session, continuously conveying the first and second video stream in real time over a network to the first and second device, wherein the second device continuously displays in real time the first video stream upon a second display peripheral of the second device, wherein the first device continuously displays in real time the first video stream upon a first display peripheral of the first device;

the imaging engine analyzing, in a first analysis, the first video stream to programmatically determine from the first video stream that a position of the first session participant is non-optimal, which refers to a position of the first participant as seen by the second participant via the second display peripheral lacking eye focus with the second participant during the live video conference session, wherein programmatically determining that the position is non-optimal comprises determining whether an eye focus rate of the first participant during the live video conference session falls within a previously established threshold range, wherein the eye focus rate is a ratio of a first time where an eye gaze of the first participant is directed at the first camera verses a second time where the eye gaze is not directed at the first camera, wherein upon determining for the first analysis that the eye focus rate falls outside the previously established threshold range, presenting an eye guide on a user interface of the first display to assist the first participant to focus their eyes in a new location indicated by the eye guide during the live video conference session, wherein the eye guide comprises at least one of a graphical symbol and a text indicating an on-screen target for the first participant to gaze at, wherein the target is immediately proximate to a first-participant-facing lense of the first camera;

the imaging engine performing a subsequent analysis of the first video stream to programmatically determine from the subsequent analysis that a position of the first session participant is improved with regard to eye focus with the second participant during the live video conference session wherein programmatically determining in the subsequent analysis that the position is improved comprises a determination that the eye focus rate falls within the previously established threshold range for the subsequent analysis; and the imaging engine in response to results of the subsequent analysis, dismissing presenting the eye guide on the user interface of the first display.

11. The system of claim 10, wherein the eye guide is presented on a remote screen, wherein the remote screen is local to and visible to the first participant.

12. The system of claim 10, wherein the eye guide is controlled from a different computing device interface, wherein a different computing device controlling the different computing device interface is communicatively linked to the first camera.

13. The system of claim 10, upon determining that the eye guide is to be presented, suppressing a live self-portrait view of the first participant within the interface of the first display.

14. The system of claim 10, upon determining that the eye guide is to be no longer presented, presenting a live self-portrait view of the first participant within the interface of the first display.

15. The system of claim 10, wherein the eye guide shows a region within which the first participant is to look for the eye gaze to be considered as being directed towards the first camera.

16. The system of claim 10, further comprising:
the imaging engine establishing a socially acceptable quantity of time associated with eye contact between the first and second participants, wherein the previously established threshold range is created from the socially acceptable quantity of time.

17. The system of claim 10, upon determining that the position of the first participant is partially non-visible, the imaging engine directing the eye gaze of the first participant to a live self-portraiture view within the interface of the first display.

18. The system of claim 10, further comprising:
the imaging engine establishing a range of eye positions for the eye gaze considered to be within a socially acceptable range to be considered as being directed at the first camera, wherein the first analysis and the second analysis utilize the range of eye positions to determine whether eye gaze is directed to the first camera or not.

19. A non-transitory computer-readable storage medium device having computer executable instructions, wherein the computer executable instructions to be executed by a processor such that the processor upon executing the computer executable instructions causes a machine to:
establishing a live video conference session between a first device and a second device, the first device having a first camera as an input peripheral that captures a first video stream of a first session participant, the second device having a second camera as an input peripheral that captures a second video stream of a second session participant, wherein the first device and the second device are remotely located devices;
during the live video conference session, continuously conveying the first video stream in real time over a network to the second device, wherein the second device continuously displays in real time the first video stream upon a second display peripheral of the second device;
during the live video conference session, continuously conveying the second video stream in real time over the network to the first device, wherein the first device continuously displays in real time the first video stream upon a first display peripheral of the first device;
during the live video conference session, the first device analyzing, in a first analysis, the first video stream to programmatically determine from the analyzing that a position of the first session participant is non-optimal, which refers to a position of the first participant as seen by the second participant via the second display peripheral lacking eye focus with the second participant during the live video conference session, wherein programmatically determining that the position is non-optimal comprises determining whether an eye focus rate of the first participant during the live video conference session falls within a previously established threshold range, wherein the eye focus rate is a ratio of a first time where an eye gaze of the first participant is directed at the first camera verses a second time where the eye gaze is not directed at the first camera;
upon determining for the first analysis that the eye focus rate falls outside the previously established threshold range, presenting an eye guide on a user interface of the first display to assist the first participant to focus their eyes in a new location indicated by the eye guide during the live video conference session, wherein the eye guide comprises at least one of a graphical symbol and a text indicating a direction for moving eyes of the first participant;
subsequent to presenting the eye guide and during the live video conference session, the first device analyzing, in a subsequent analysis, the first video stream to programmatically determine from the subsequent analysis that a position of the first session participant is improved with regard to eye focus with the second participant during the live video conference session, wherein the determination the position is improved comprises a determination that the eye focus rate falls within the previously established threshold range for the subsequent analysis; and
upon determining for the subsequent analysis, that the eye focus rate falls within the previously established threshold range, updating the user interface so that it is no longer presenting the eye guide on the user interface of the first display.

\* \* \* \* \*